(No Model.)
N. ISACHSON.
HOOK.
No. 499,118. Patented June 6, 1893.
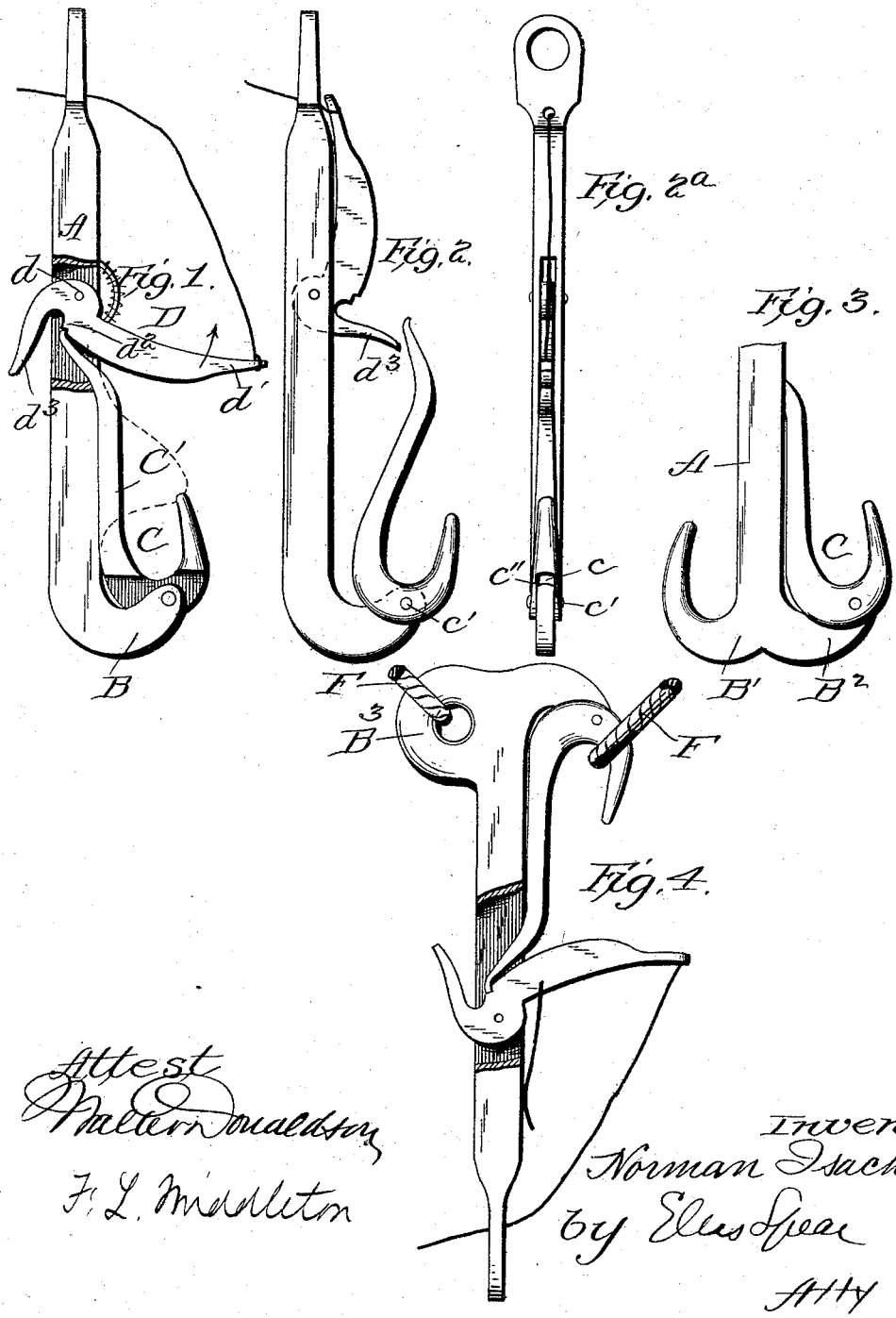

UNITED STATES PATENT OFFICE.

NORMAN ISACHSON, OF MARION, IDAHO.

HOOK.

SPECIFICATION forming part of Letters Patent No. 499,118, dated June 6, 1893.

Application filed January 9, 1893. Serial No. 457,867. (No model.)

*To all whom it may concern:*

Be it known that I, NORMAN ISACHSON, a citizen of the United States of America, residing at Marion, in the county of Cassia and State of Idaho, have invented certain new and useful Improvements in Hooks, of which the following is a specification.

The object of this invention is to provide a simple and strong hook which may hold the article connected therewith securely and safely, but which may be easily and quickly operated to release said article without necessitating any loosening of the connections.

I have shown several embodiments of my invention in the accompanying drawings, in which—

Figure 1 represents an elevation of a simple form of hook constructed in accordance with my invention. Fig. 2 is a sectional view of the same. Fig. 2$^a$ is a view a quarter turn from Fig. 1. Fig. 3 is an elevation of a double hook, and Fig. 4 represents the hook adapted for use as a bottom trip for a hay sling.

The main or body portion of the hook is shown as comprising the shank A, with the curved or hooked end B, extending to one side therefrom.

C, is a supplemental hook which is mounted upon the extreme outer end of the portion B, and is adapted to have pivotal movement thereon. I prefer to secure the supplemental hook to the extension, as shown, by forming a recess $c$, in the under edge of the said supplemental hook into which the extension projects, and passing a rivet $c'$ through the walls $c''$ of the hook and through the extension. The supplemental hook is provided with a tapering extension C' which is preferably slightly curved, and extends up into a recess formed in the shank A. Within this recess is pivoted a trip lever D, upon the pin $d$, and the outer end $d'$ of this trip lever may be connected with a cord passing through a recess $e$, in the upper end of the shank and extending to a point within reach of the operator. The trip lever is provided with a retaining shoulder or lug $d^2$, which is adapted to bear against the tapered end C' of the supplemental hook as shown in Fig. 1, and thus retain it in the position shown in that figure.

It will be observed that the pivot upon which the supplemental hook is mounted is slightly to one side of the center of the said hook so that any strain upon the supplemental hook only tends to keep the hook in the position shown in full lines in Fig. 1, and all accidental movement is prevented by the lug on the trip lever which engages the tapering end of the supplemental hook. By thus pivoting the supplemental hook upon the main hook as described all strain upon the supplemental hook will fall within the pivot, and should any of the parts become deranged or out of order as they are sometimes apt to do under heavy strain the supplemental hook will still retain its load, and even should the supplemental hook itself break, or the pivot upon which it is mounted, the main hook would still retain the load. There is, however, an angular extension $d^3$ formed upon the trip lever, and when it is desired to operate the hook to release the article suspended therefrom the trip lever is turned upon its pivot in the direction of the arrow to bring this angular extension against the rear side of the portion C', and as the movement of the lever removes the shoulder from the path of the said portion C' the pressure from the angular extension will throw the hook forward or into the position shown in Fig. 2 and operate to unhook the article connected therewith. It is desirable to provide a spring in connection with the trip lever to keep the shoulder normally in contact with the tapered end of the supplemental hook, and this spring may be either in the form of a coiled spring as shown in Fig. 1, or a flat spring as shown in Fig. 4.

As before stated the strain upon the supplemental hook comes between the pivot and the shank of the hook, thus tending to retain the supplemental hook in its hooked position, but of the pivot is positioned so near the center of the supplemental hook that the strain comes only very slightly within said pivot, and there is only a very slight amount of movement imparted to the article suspended from the hook when the trip lever is operated to release the said article. I have found this feature very advantageous in many situations, as for instance, when raising or suspending heavy bodies, connecting heavy wagons, or under similar circumstances. Where the ordinary form of hook is used it is necessary to have a certain amount of slack to the chain connected thereto, or to raise the article suspended from the hook, before the hook can be released, but with my improved hook this is not necessary as the outward movement of the supplemental hook in unhooking simply lowers the retaining end of the hook and causes the suspended article to slide therefrom without raising the article or increasing the strain any material amount.

It may be desirable to form the shank with a shoulder A' or cheek so that when the supplemental hook is in its retaining position the retaining end will come in proximity to the said lug and form an inclosed space as shown in dotted lines in Fig. 1.

In Fig. 3 I have shown my invention embodied in a double hook, used for the top trips for hay slings, and similar purposes, the shank A in this instance having two curved or projecting portions B', B², one of which is in the form of an ordinary hook, and the other provided with the supplemental hook substantially as above described.

In Fig. 4 I have represented the invention as embodied in a hook used for an under trip for hay slings, in this case the shank having a ring B³ projecting from the side opposite the portion which supports the supplemental hook in which the end of the sling F is secured, the other end being engaged by the supplemental hook which operates as already described.

I claim as my invention—

1. In combination with the supporting shank the retaining and releasing hook pivotally connected to said shank and adapted to be held by the draft thereon in its retaining position, with a lever also carried by the shank for positively operating said supplemental hook, substantially as described.

2. In combination with the supporting shank, the retaining and releasing hook pivotally connected thereto and adapted to be held by the draft thereon in its retaining position, a lever pivoted upon the supporting shank having a shoulder for preventing accidental displacement of the retaining hook, and having an arm for engaging the retaining hook and positively operating it to release the load, substantially as described.

In testimony whereof I affix my signature in presence of two witnesses.

NORMAN ISACHSON.

Witnesses:
C. A. TOLMAN,
ELIZABETH TOLMAN.